United States Patent
Irwin

(10) Patent No.: US 6,497,027 B1
(45) Date of Patent: Dec. 24, 2002

(54) METHOD FOR CONTROLLING AXLE SHAFT ENDPLAY IN DIFFERENTIAL ASSEMBLY

(75) Inventor: Earl James Irwin, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 2 days.

(21) Appl. No.: 09/667,766

(22) Filed: Sep. 22, 2000

(51) Int. Cl.[7] ............................................. F16H 48/00
(52) U.S. Cl. ................................ 29/407.01; 29/407.05; 475/230
(58) Field of Search ........................ 29/407.61, 407.05, 29/407.07, 898.07, 898.09; 475/230; 74/409

(56) References Cited

U.S. PATENT DOCUMENTS

| | | | | |
|---|---|---|---|---|
| 4,365,524 A | * | 12/1982 | Dissett et al. ................. | 74/715 |
| 4,491,035 A | * | 1/1985 | Gleasman et al. ............ | 74/715 |
| 4,491,036 A | * | 1/1985 | Stritzel ........................ | 74/715 |
| 5,131,894 A | | 7/1992 | Hilker | |
| 5,400,669 A | * | 3/1995 | Lamela ........................ | 74/333 |
| 5,509,862 A | * | 4/1996 | Sherman ..................... | 475/230 |
| 5,620,388 A | * | 4/1997 | Schlegelmann et al. .... | 475/230 |
| 5,624,345 A | | 4/1997 | Graft et al. | |
| 6,014,916 A | * | 1/2000 | Tyson .......................... | 475/230 |
| 6,254,505 B1 | * | 7/2001 | Forrest ........................ | 475/230 |

FOREIGN PATENT DOCUMENTS

| | | | | |
|---|---|---|---|---|
| GB | 2086498 A1 | * | 5/1982 | ................. 475/230 |
| JP | 04321847 A1 | * | 11/1992 | ................. 475/230 |

* cited by examiner

*Primary Examiner*—David P. Bryant
*Assistant Examiner*—Jermie E. Cozart
(74) *Attorney, Agent, or Firm*—Liniak, Berenato & White

(57) ABSTRACT

A method for controlling an axle shaft endplay in a differential assembly is disclosed. The desired axle shaft endplay is determined by a differential manufacturer based on the specific operating conditions of the differential assembly. In accordance with the endplay controlling method of the present invention, first the differential is partially assembled by mounting side gears and a differential pinion shaft carrying pinions in a differential case. Then, the manufacturer determines a thickness of an axle shaft-retaining ring that would provide the desired endplay. The manufacturer is provided with an endplay controlling kit of a plurality of the retaining rings of assorted thickness. The appropriate retaining ring is selected from the kit having the thickness as determined in the previous step. Next, axle shafts are inserted into the differential case through the side gears, and the selected retaining ring is mounted to the axle shafts. After this step, the assembly of the differential is completed.

10 Claims, 4 Drawing Sheets

METHOD FOR CONTROLLING AXLE SHAFT ENDPLAY IN DIFFERENTIAL ASSEMBLY

BACKGROUND OF THE INVENTION

1. Field of the Invention

This invention pertains to differential systems for motor vehicles and, more particularly, the invention pertains to a method for controlling an axle shaft endplay in a differential assembly.

2. Description of the Prior Art

In conventional drivelines, particularly those for rear wheel drive vehicles, the left-hand and right-hand axle shafts extend laterally from a differential mechanism that includes side bevel gears in continuous meshing engagement with differential pinions supported rotatably on a pinion shaft carried on a differential carrier. The differential carrier is driven rotatably by a set of meshing bevel gears, one of which is driven by a drive shaft disposed substantially perpendicular to the axle shafts. The side bevel gears typically are connected rotatably to the axle shafts by a spline connection formed on a shoulder near the inboard ends of the axle shafts. Each axle shaft carries another shoulder at its axially innermost extremity, the second shoulder located adjacent the differential pinion shaft.

Located between the shoulders on the axle shaft is an annular recess that is axially aligned with the recess formed on the corresponding side bevel gear. A slotted washer or retainer ring, fitted within the recesses of the axle shaft and side bevel gear, limits outward axial movement of the axle shaft relative to the side bevel gear. However, each axle shaft is free to move along the spline connection axially inward toward the differential pinion shaft. This amount of an internal axial clearance is called an axle shaft endplay.

The excessive amount of the endplay in the differential assemblies allows the axle shafts to shift axially inwardly relative to the differential case and jar or knock against the pinion shaft. Moreover, the conventional assembly can lead to grinding away of the end of the side yoke causing excessive negative camber, which in turn can lead to uneven tire wear and poor driving stability. It can also cause particles of the side yokes to embed themselves in the differential clutch plates causing slippage of the differential unit resulting in a clunking or thumping noise. If the wear is left unchecked, it may increase to a point where the flange will shear or cut into the differential case causing a leakage of fluid and ultimately leading to complete destruction of the differential assembly.

The current retention method of the axle shaft does not allow an endplay control. Therefore, the need exists to control the endplay of the axle shaft in order to provide a predetermined desired endplay in accordance with vehicle manufacturer's specification and/or depending on the operational conditions of the axle assembly.

SUMMARY OF THE INVENTION

It is an object of the present invention to provide a method for controlling an axial displacement of an axle shaft in a differential assembly.

The method, according to the present invention, for controlling an axle shaft endplay in a differential assembly is preformed in the following manner: first, a value of a desired endplay $\delta=\delta_p$ is determined based on particular operational conditions and the type of the differential assembly. A differential mechanism is partially assembled including side gears and a pinion shaft carrying bevel pinion gears in continuous meshing engagement with the side gears in a differential case. Then, a thickness $W_R$ of the axle shaft retaining ring is calculated that would provide the desired endplay $\delta_p$. In accordance with the present invention, the manufacturer of the axle assemblies is provided with an endplay controlling kit that includes a plurality of the axle shaft retaining rings of assorted thickness. The appropriate retaining ring having the determined thickness $W_R$ calculated during the previous step of the present method, is selected from the plurality of the assorted retaining rings of the endplay controlling kit. Next, the axle shaft is inserted into the differential case through the side gear, and the selected retaining ring is mounted to the axle shaft. Finally, remaining components of the differential assembly are assembled, thus, completing the process of assembling the differential assembly. The plurality of the axle shaft retaining rings in the endplay controlling kit have the thickness ranging from a thinnest having the thickness $W_{Rmin}$ to the thickest having the thickness $W_{Rmax}$. The thinner retainer rings provide more endplay, and the thicker retainer rings provide less endplay. Also, the differential assembly with a zero axle endplay may be provided.

Therefore, the present method for controlling the endplay of the axle shaft solves the need for a solution to the problem of controlling the axle shaft endplay in the vehicular differential assemblies in a simple, efficient and inexpensive manner.

These and other benefits of the present invention will become apparent from the following description and associated drawings.

DESCRIPTION OF THE PREFERRED EMBODIMENT

Figure 1:
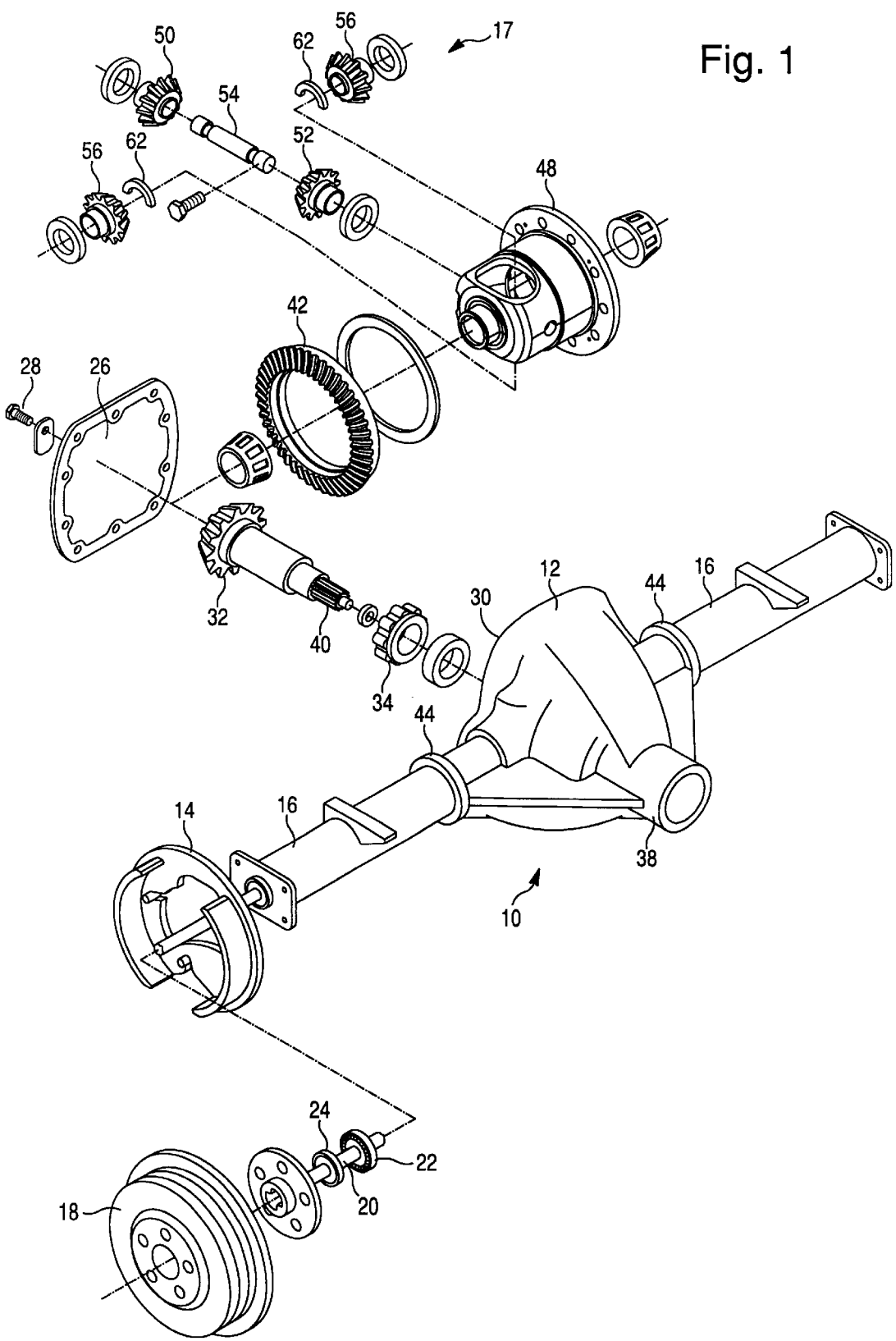
FIG. 1 is an exploded perspective view of an axle assembly including a differential assembly.
Figure 2:
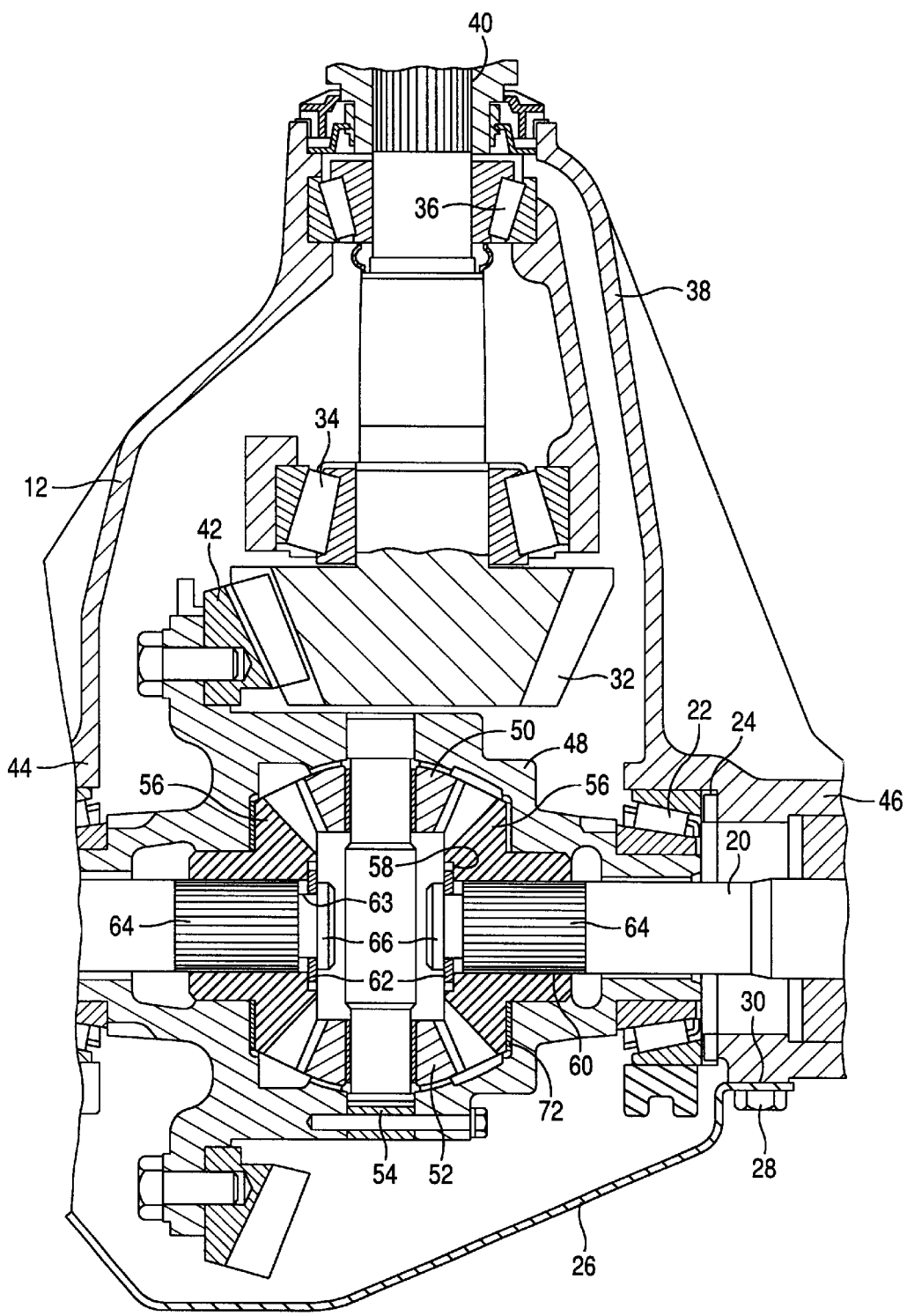
FIG. 2 is a cross section through the differential assembly of FIG. 1.

Referring first to FIGS. 1 and 2, an axle assembly 10, to which the present invention can be applied, includes an axle housing 12, which contains a differential assembly 17 and a reservoir of hydraulic lubricant, brake assembly 14 located at the end of an axle tube 16 extending outboard from the ends of the axle housing 12, brake drum 18, axle shafts 20, axle shaft bearings 22, and bearing seals 24.

A cover 26 is connected by bolts 28 to a rear face 30 of the housing 12 hydraulically sealing the housing against the passage of lubricant.

Located within the axle housing 12 is a drive pinion 32 rotatably supported by a rear drive pinion bearing 34 and a front drive pinion bearing 36 supported on an inner surface of a portion of an axle carrier casing 38 that extends forward from a center line of the axle assembly. A drive shaft (not shown), drivably connected to an output shaft of a transmission (not shown), is connected through splines 40 to the shaft that drives the drive pinion 32.

The axle housing assembly 12 also includes laterally directed tubular extensions 44, which receive therein the axle tubes 16. Located within the axle housing 12 is a differential case 48 housing a differential mechanism. The differential mechanism includes a ring gear 42, in continuous meshing engagement with the drive pinion 32. The differential case 48 supports bevel pinion gears 50, 52 for rotation on a differential pinion shaft or cross pin 54. Side bevel gears 56 are in continuous meshing engagement with the pinions 50, 52 and are drivably connected to left and right axle shafts, located within the axle tubes 16.

The axle shaft 20 is connected by a spline 60 to the corresponding side bevel gear 56. A slotted retainer ring 62, such as that shown in FIG. 2, is fitted within an annular recess 63 formed on the axle shaft 20 located between a shoulder 64 on which the external spline 60 is formed, and a terminal shoulder 66 located at an inboard end of the axle shaft. The retainer ring 62 is provided for limiting outward axial movement of the axle shaft 20 relative to the side bevel gear 56 by abutting an end surface 58 thereof. However, each axle shaft is free to move along the spline connection axially inward toward the differential pinion shaft. This amount of an internal axial clearance is called an axle shaft endplay.

Figure 3:
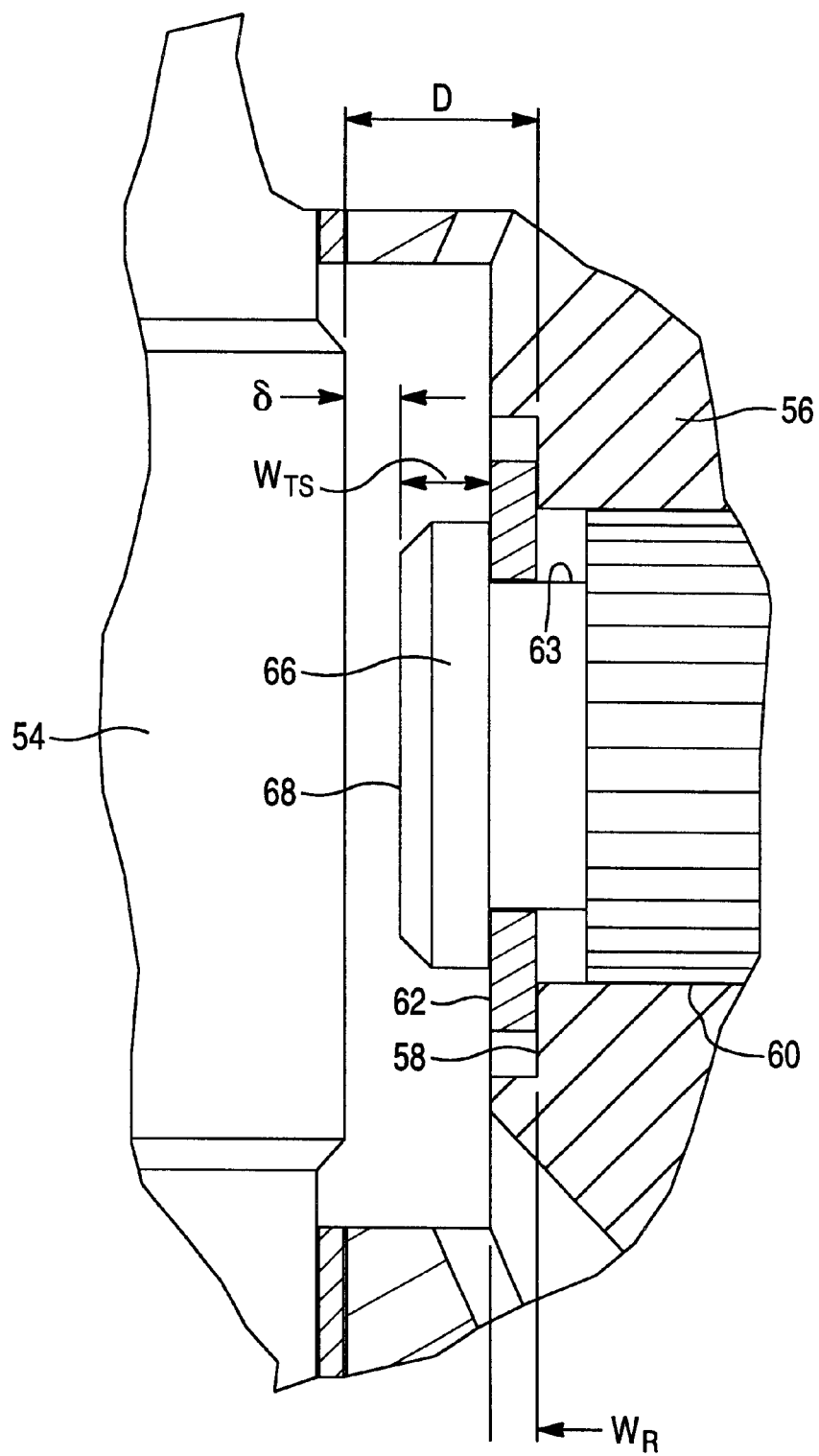
FIG. 3 is a cross section through a centerline of an axle shaft showing the axle shaft in its outermost position.
Figure 4:
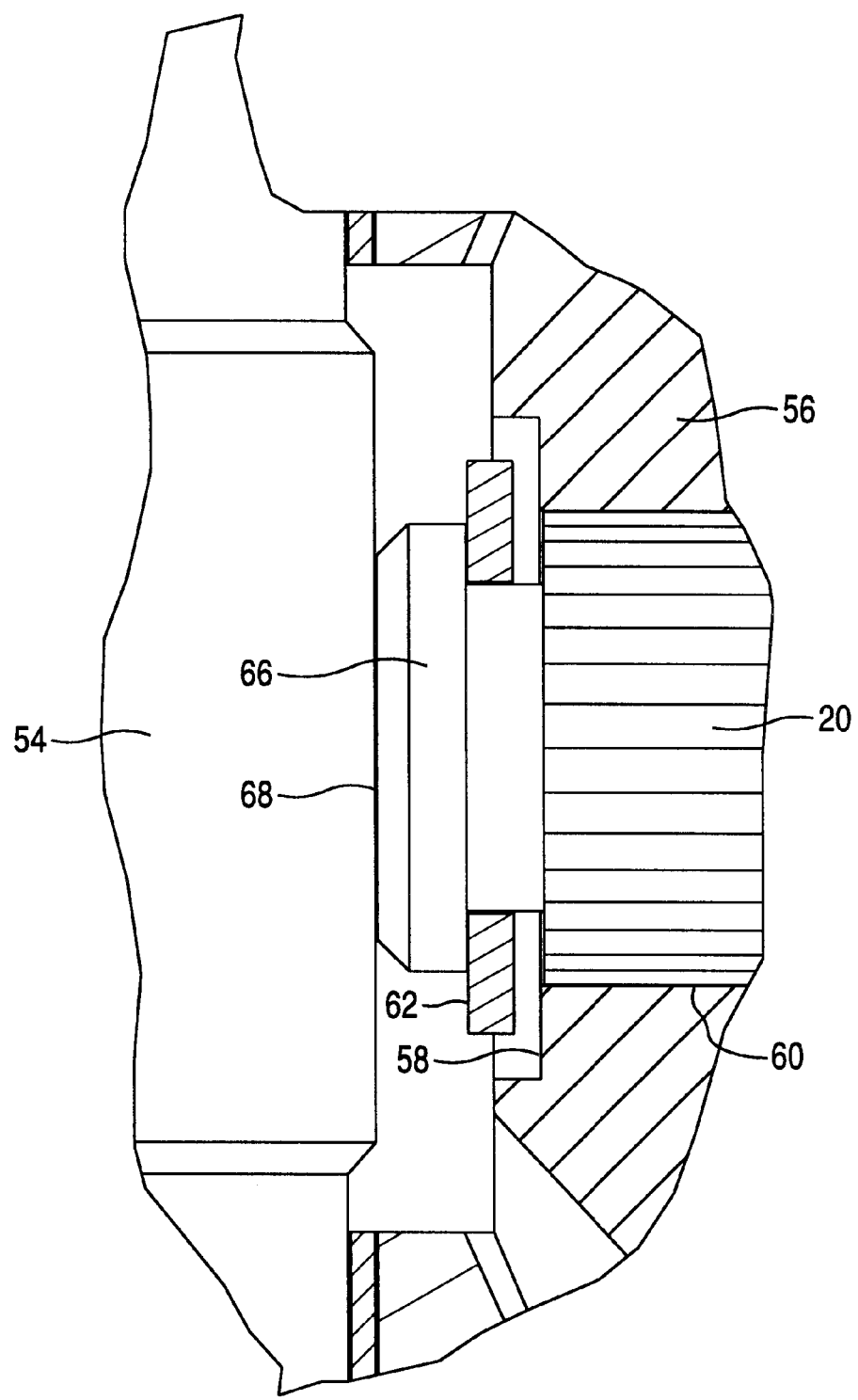
FIG. 4 is a cross section through a centerline of an axle shaft showing the axle shaft in its innermost position.

As illustrated in FIG. 3, the axle shaft endplay is an amount of an internal axial clearance $\delta$ of the axle shaft 20. In other words, the endplay is the amount of possible axial movement of the axle shaft 20 between its innermost position when an inboard contact face 68 of the axle shaft 20 is in contact with an outer cylindrical surface of the pinion shaft 54, as shown in FIG. 4, and its outermost position when the retainer ring 62 abuts the end surface 58 of the side gear 56, as shown in FIG. 3. As could be easily understood by those skilled in the art, the amount of the endplay $\delta$ depends, among other factors, on a thickness $W_R$ of the retainer ring 62. Obviously, the thicker retainer ring provides less endplay, and vice versa.

In accordance with the present invention, a method for controlling an endplay of the axle shaft 20 is provided. The method is preformed in the following manner: first, a value of a desired endplay $\delta=\delta_p$ is determined based on the particular operational conditions and the type of the differential assembly. The differential mechanism is partially assembled including side gears 56 and a pinion shaft 54 carrying the bevel pinion gears 50 and 52 in continuous meshing engagement with the side gears 56 in a differential case.

Then, the thickness $W_R$ of the retaining ring 62 is calculated in accordance with the following equation:

$$W_R = D - W_{TS} - \delta_P; \tag{1}$$

where

D is a distance from the outer cylindrical surface of the pinion shaft 54 to the end surface 58 of the side gear 56, as shown in FIG. 3;

$W_{TS}$ is a thickness of the terminal shoulder 66 of the axle shaft 20, as shown in FIG. 3;

$\delta_p$ is the predetermined value of the desired endplay.

The manufacturer of the axle assemblies is provided with an endplay controlling kit that includes a plurality of the axle shaft retaining rings of assorted thicknesses. Then, the appropriate retaining ring 62 having the determined thickness $W_R$ calculated utilizing the equation (1), that provides the desired endplay $\delta_p$, is selected from the plurality of the assorted retaining rings of the endplay controlling kit. Next, the axle shaft 20 is inserted into the differential case 48 through the side gear 56. The selected retaining ring 62 is then mounted in the recess 63. Finally, remaining components of the differential assembly are assembled, thus, completing the process of assembling the differential assembly.

It will be appreciated that the plurality of the axle shaft retaining rings in the endplay controlling kit have the thickness ranging from a thinnest having the thickness $W_{Rmin}$ to the thickest having the thickness $W_{Rmax}$. Naturally, the recess 63 is designed to accommodate the thickest retaining rings in the endplay controlling kit. It would be obvious to those skilled in the art that the thinner retainer rings provide more endplay, and the thicker retainer rings provide less endplay. It will be appreciated that the axle assembly with a zero endplay may be provided, when the thickness of the retainer ring $W_R$ is calculated in accordance with the following equation:

$$W_R = D - W_{TS}. \tag{2}$$

Preferably, the thickest retaining rings in the endplay controlling kit has the thickness $W_{Rmax} = D - W_{TS}$, providing the zero endplay.

As evident from the foregoing description, the present invention overcomes the drawbacks inherent in the previous designs of the prior art by providing a method to control or eliminate axle shaft endplay.

Therefore, the method for controlling the endplay of the axle shaft in accordance with the present invention solves the need for a solution to the problem of controlling the axle shaft endplay in the vehicular differential assemblies in a simple, efficient and inexpensive manner.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It will also be understood that words used are words of description rather than a limitation. It is also intended that the scope of the present invention be defined by the claims appended thereto.

What is claimed is:

1. A method for controlling an axle shaft endplay in a differential assembly, said method comprising the steps of:
    (a) assembling a side gear and a differential pinion shaft carrying pinions in continuous meshing engagement with said side gear in a differential case;
    (b) determining a desired axle shaft endplay $\delta_P$;
    (c) providing an axle shaft adapted to non-rotatably engage said side gear, said axle shaft having an annular recess located adjacent to a terminal shoulder provided at an inboard end of said shaft, said recess is provided for receiving a retainer ring, said retainer ring is provided to limit an axial displacement of said axle shaft in an outboard direction;
    (d) determining a thickness $W_R$ of said retainer ring that would provide said desired axle shaft endplay;
    (e) selecting said retainer ring having the thickness $W_R$ as determined in step (d) for selectively controlling said endplay;

(f) inserting said axle shaft through said side gear from said outboard direction toward an inboard direction; and (g) mounting said selected retainer ring in said recess.

2. The method for controlling an axle shaft endplay in a differential assembly as defined in claim 1, wherein said step (d) includes the steps of:

measuring a distance D from said pinion shaft to an end surface of said side gear;

measuring a thickness $W_{TS}$ of said terminal shoulder of said axle shaft;

determining a thickness $W_R$ of said retainer ring that would provide said desired axle shaft endplay $\delta_P$, wherein the thickness of said retainer ring is determined in accordance with the following equation:

$$W_R = D - W_{TS} - \delta_P.$$

3. The method for controlling an axle shaft endplay in a differential assembly as defined in claim 1, wherein said retainer ring is a C-ring.

4. The method for controlling an axle shaft endplay in a differential assembly as defined in claim 1, wherein said retainer ring is selected from an endplay controlling kit including a plurality of axle shaft retainer rings of assorted thickness.

5. The method for controlling an axle shaft endplay in a differential assembly as defined in claim 4, wherein said annular recess in said axle shaft is adapted to accommodate a thickest retainer ring from said endplay controlling kit.

6. The method for controlling an axle shaft endplay in a differential assembly as defined in claim 5, wherein the thickest retainer ring in said endplay controlling kit provides a zero endplay.

7. A method for controlling an axle shaft endplay in a differential assembly, said method comprising the steps of:

(a) assembling a side gear and a differential pinion shaft carrying pinions in continuous meshing engagement with said side gear in a differential case;

(b) providing an axle shaft adapted to non-rotatably engage said side gear, said axle shaft having an annular recess located adjacent to a terminal shoulder provided at an inboard end of said shaft, said recess is provided for receiving a retainer ring, said retainer ring is provided to limit an axial displacement of said axle shaft in an outboard direction;

(c) providing an axle shaft endplay controlling kit including a plurality of said axle shaft retainer rings of assorted thickness;

(d) determining a desired axle shaft endplay $\delta_P$;

(e) measuring a distance D from said pinion shaft to an end surface of one of said side gears;

(f) measuring a thickness $W_{TS}$ of said terminal shoulder of said axle shaft;

(g) determining a thickness $W_R$ of said retainer ring that would provide said desired axle shaft endplay $\delta_P$, wherein the thickness of said retainer ring is determined in accordance with the following equation:

$$W_R = D - W_{TS} - \delta_P;$$

(h) selecting said retainer ring having the thickness $W_R$ as determined in step (g) from said axle shaft endplay controlling kit for selectively controlling said endplay;

(i) inserting said axle shaft into said differential case through said side gear from said outboard direction toward an inboard direction; and (j) mounting said selected retainer ring in said recess.

8. The method for controlling an axle shaft endplay in a differential assembly as defined in claim 7, wherein a thickest retainer ring in said endplay controlling kit provides a zero endplay.

9. A method for controlling an axle shaft endplay in a differential assembly, said method comprising the steps of:

(a) assembling a side gear and a differential pinion shaft carrying pinions in continuous meshing engagement with said side gear in a differential case;

(b) determining a desired axle shaft endplay $\delta_P$;

(c) providing an axle shaft adapted to non-rotatably engage said side gear, said axle shaft having an annular recess located adjacent to a terminal shoulder provided at an inboard end of said shaft, said recess is provided for receiving a retainer ring, said retainer ring is provided to limit an axial displacement of said axle shaft in an outboard direction;

(d) determining a thickness $W_R$ of said retainer ring that would provide said desired axle shaft endplay;

(e) selecting said retainer ring having the thickness $W_R$ as determined in step (d), for selectively controlling said endplay;

(f) inserting said axle shaft through said side gear from said outboard direction toward an inboard direction; and (g) mounting said selected retainer ring in said recess, wherein said retainer ring is selected from an endplay controlling kit including a plurality of axle shaft retainer rings of assorted thickness, and wherein said annular recess in said axle shaft is adapted to accommodate a thickest retainer ring from said endplay controlling kit.

10. The method for controlling an axle shaft endplay in a differential assembly as defined in claim 9, wherein the thickest retainer ring in said endplay controlling kit provides a zero endplay.

* * * * *